(12) United States Patent
Leming, III et al.

(10) Patent No.: US 11,386,016 B2
(45) Date of Patent: Jul. 12, 2022

(54) FLEXIBLE STORAGE AND OPTIMIZED SEARCH FOR MULTIPLE PAGE SIZES IN A TRANSLATION LOOKASIDE BUFFER

(71) Applicant: Ampere Computing LLC, Santa Clara, CA (US)

(72) Inventors: George Van Horn Leming, III, Santa Clara, CA (US); John Gregory Favor, Santa Clara, CA (US); Stephan Jean Jourdan, Santa Clara, CA (US); Jonathan Christopher Perry, Santa Clara, CA (US); Bret Leslie Toll, Santa Clara, CA (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 16/722,974

(22) Filed: Dec. 20, 2019

(65) Prior Publication Data
US 2021/0191877 A1 Jun. 24, 2021

(51) Int. Cl.
*G06F 12/1027* (2016.01)
(52) U.S. Cl.
CPC ...... *G06F 12/1027* (2013.01); *G06F 2212/68* (2013.01)
(58) Field of Classification Search
None
See application file for complete search history.

(56) References Cited

U.S. PATENT DOCUMENTS

| | | | |
|---|---|---|---|
| 7,159,095 B2 | 1/2007 | Dale et al. | |
| 8,364,933 B2 | 1/2013 | Herrenschmidt et al. | |
| 9,058,284 B1* | 6/2015 | Ben-Meir | G06F 12/10 |
| 10,445,250 B2 | 10/2019 | Fleming et al. | |
| 2005/0027961 A1* | 2/2005 | Zhang | G06F 12/1027 711/207 |
| 2013/0080735 A1* | 3/2013 | Kimura | G06F 12/1027 711/207 |
| 2014/0115297 A1* | 4/2014 | Cain, III | G06F 12/1027 711/207 |
| 2019/0227947 A1* | 7/2019 | Keppel | G06F 12/1027 |
| 2020/0174945 A1* | 6/2020 | Mukherjee | G06F 12/1036 |

OTHER PUBLICATIONS

Marathe, Y. et al., "CSALT: Context Switch Aware Large TLB," MICRO-50, Oct. 14-18, 2017, Cambridge, MA, ACM, 14 pages.

* cited by examiner

*Primary Examiner* — Stephanie Wu
(74) *Attorney, Agent, or Firm* — Withrow & Terranova, PLLC (57) ABSTRACT

A memory management unit (MMU) including a unified translation lookaside buffer (TLB) supporting a plurality of page sizes is disclosed. In one aspect, the MMU is further configured to store and dynamically update page size residency metadata associated with each of the plurality of page sizes. The page size residency metadata may include most recently used (MRU) page size data and/or a counter for each page size indicating how many pages of that page size are resident in the unified TLB. The unified TLB is configured to determine an order in which to perform a TLB lookup for at least a subset of page sizes of the plurality of page sizes based on the page size residency metadata.

38 Claims, 7 Drawing Sheets

FLEXIBLE STORAGE AND OPTIMIZED SEARCH FOR MULTIPLE PAGE SIZES IN A TRANSLATION LOOKASIDE BUFFER

BACKGROUND

I. Field of the Disclosure

The technology of the disclosure relates generally to address translation, and specifically to optimizing lookups in a translation lookaside buffer supporting multiple page sizes.

II. Background

Memory management units (MMUs) conventionally provide address translation services for memory operations in processors and other systems on chip (SOCs). An MMU may include a translation lookaside buffer (TLB), which may serve as a cache memory for recent address translations of virtual addresses, so that recently-used address translations can be retrieved quickly. Otherwise, address translations may be performed by a page table walk, which may be a long-latency operation, and which may unacceptably degrade the overall performance of the processor or SoC of which the TLB is a part.

The processor or SOC of which the TLB is a part may be configured to support multiple different memory page sizes (which may be specified by the architecture of the processor, for example) when accessing an associated memory hierarchy, for example in order to accommodate different programming models and paging schemes for a variety of virtual machines (VMs) and hypervisors/virtual machine monitors (VMMs). One conventional approach to handling multiple page sizes is to provide separate TLBs for each page size (e.g., there may be separate physical memory banks for each page size). However, in systems where a relatively large number of page sizes may be supported, implementing a TLB for each possible page size may be inefficient from a hardware area perspective, and may result in a large number of the TLBs sitting relatively idle and/or being sparsely populated if a particular workload uses a relatively small number of the supported page sizes, and may mean that each individual TLB can store fewer address translations leading to more frequent page table walks and the attendant performance degradation.

A further conventional approach is to implement a unified TLB. A unified TLB is one in which each TLB entry is configured to store all possible page sizes of the associated memory hierarchy. This mitigates the hardware area penalty and inefficiency of under-utilization of having an individual TLB for each page size, but at the cost of complexity and latency of search operations, since each TLB lookup must go through all the possible page sizes in order to detect a miss. Although this may be less detrimental to performance than performing page table walks, it still may be undesirable from a performance perspective.

SUMMARY OF THE DISCLOSURE

Aspects disclosed in the detailed description include a memory management unit (MMU) including a unified translation lookaside buffer (TLB) supporting a plurality of page sizes. The MMU is further configured to store and dynamically update page size residency metadata associated with each of the plurality of page sizes. The page size residency metadata may include most recently used (MRU) page size data and/or a counter for each page size indicating how many pages of that page size are resident in the unified TLB. The unified TLB is configured to determine an order in which to perform a TLB lookup for at least a subset of page sizes of the plurality of page sizes based on the page size residency metadata.

In this regard in one aspect, an apparatus comprises a memory management unit (MMU) including a unified translation lookaside buffer (TLB) configured to support a plurality of page sizes. The MMU is further configured to store and dynamically update page size residency metadata associated with each of the plurality of page sizes. The TLB is further configured to perform a lookup for at least a subset of page sizes of the plurality of page sizes in an order based on the page size residency metadata.

In another aspect, an apparatus comprises means for managing memory, the means for managing memory including means for caching translations configured to support a plurality of page sizes. The means for managing memory is further configured to store and dynamically update page size residency metadata associated with each of the plurality of page sizes. The means for caching translations is further configured to perform a lookup for a least a subset of page sizes of the plurality of page sizes in an order based on the page size residency metadata.

In yet another aspect, a method comprises receiving a lookup for a unified TLB configured to support a plurality of page sizes. The method further comprises determining an order in which to perform the lookup on at least a subset of the plurality of page sizes based on page size residency metadata which is configured to be dynamically updated.

In yet another aspect, a non-transitory computer-readable medium having stored thereon computer executable instructions which, when executed by a processor, cause the processor to receive a lookup for a unified TLB configured to support a plurality of page sizes. The non-transitory computer-readable medium further comprises instructions which, when executed by the processor, cause the processor to determine an order in which to perform the lookup on at least a subset of the plurality of page sizes based on page size residency metadata which is configured to be dynamically updated.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Figure 1:
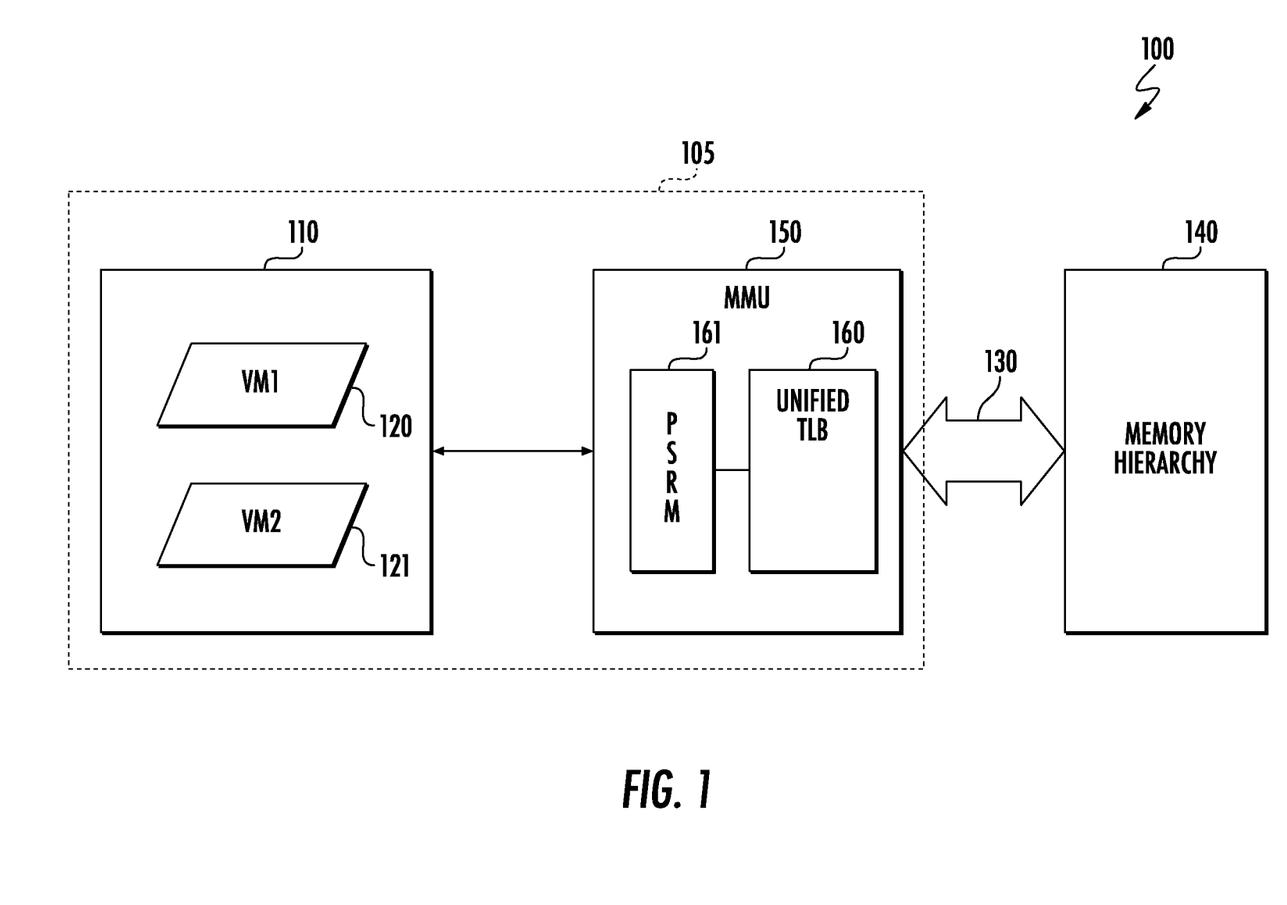
FIG. 1 is a block diagram of an exemplary processing system including a unified translation lookaside buffer (TLB) supporting a plurality of page sizes.

Aspects disclosed in the detailed description include a memory management unit (MMU) including a unified translation lookaside buffer (TLB) supporting a plurality of page sizes. The MMU is further configured to store and dynamically update page size residency metadata associated with each of the plurality of page sizes. The page size residency metadata may include most recently used (MRU) page size data and/or a counter for each page size indicating how many pages of that page size are resident in the unified TLB. The unified TLB is configured to determine an order in which to perform a TLB lookup for at least a subset of page sizes of the plurality of page sizes based on the page size residency metadata In this regard, FIG. 1 is a block diagram 100 of an exemplary processing system including a unified translation lookaside buffer (TLB) supporting a plurality of page sizes. The processing system may include a central processing unit (CPU) 105, which may include one or more processor cores such as processor core 110. In one aspect, processor core 110 may be configured to execute a first virtual machine 120 and a second virtual machine 121. Virtual machine 120 and virtual machine 121 may each be configured to use a plurality of page sizes when performing transactions with a memory hierarchy 140, and those transactions may be communicated via a system bus 130 to which the CPU 105 and the memory hierarchy 140 are both coupled.

In order for the CPU 105 to perform memory transactions, the CPU 105 may include a memory management unit (MMU) 150 which is coupled to the memory hierarchy 140 and configured to perform those memory transactions with respect to the memory hierarchy 140. As part of performing those memory transactions, which may each be associated with a particular page size of the plurality of page sizes used, for example, by virtual machine 120 and virtual machine 121, the MMU 150 may include a unified translation lookaside buffer 160, which may be configured to provide a cache of address translations (e.g., may take a received virtual address, perform a check of the unified TLB 160 to see if the virtual address has a known translation at one of the page sizes of the plurality of page sizes, and may provide the translated address so that the MMU 150 may perform the memory transaction) related to the memory transactions.

The MMU 150 may further include a page size residency metadata block 161 to provide enhanced address translation services related to the unified TLB 160. As discussed above, because a unified TLB such as unified TLB 160 is capable of storing translations for pages of a plurality of sizes, conventionally such a TLB would search for a translation in every one of the possible page sizes, which could include search for the translation in page sizes that are not currently resident in the unified TLB. To mitigate this effect, the page size residency metadata block 161 tracks metadata associated with TLB transaction and/or page sizes that are present in the unified TLB 160, and provides this information to the unified TLB 160 in order to make lookups in the unified TLB 160 more efficient. In one aspect, the page size residency metadata block 161 may comprise a plurality of counters, each counter associated with a page size of the plurality of page sizes, and which keep an exact count of the number of pages of each page size that have a translation in the unified TLB 160 (ranging from 0 to the maximum number of pages of that size that may be resident in the unified TLB 160). In another aspect, the page size residency metadata block 161 may comprise page size lookup order information. The page size lookup order information can be, for example, a list of all possible page sizes in most-recently-used order, most-frequently-used order, or any other order that may be relevant to the expected memory access pattern of a particular workload being executed on the CPU 105. In one aspect, the information from the plurality of counters may be used in the unified TLB 160 to suppress lookups for page sizes that are not currently resident in the unified TLB 160 (i.e., the counters associated with those page sizes are 0). In another aspect, the most-recently-used order of the plurality of page sizes may be used in the unified TLB 160 to establish an order in which to search for a page in the plurality of page sizes capable of being stored in the unified TLB 160 (i.e., more recently used page sizes will be looked up before less recently used page sizes). In yet another aspect, the counters (or other similar metadata) may be used to establish a most-frequently-used order in which to search for a page in the plurality of page sizes capable of being stored in the unified TLB 160 (i.e., page sizes with more entries currently stored will be looked up before page sizes with less entries currently stored).

Figure 2:
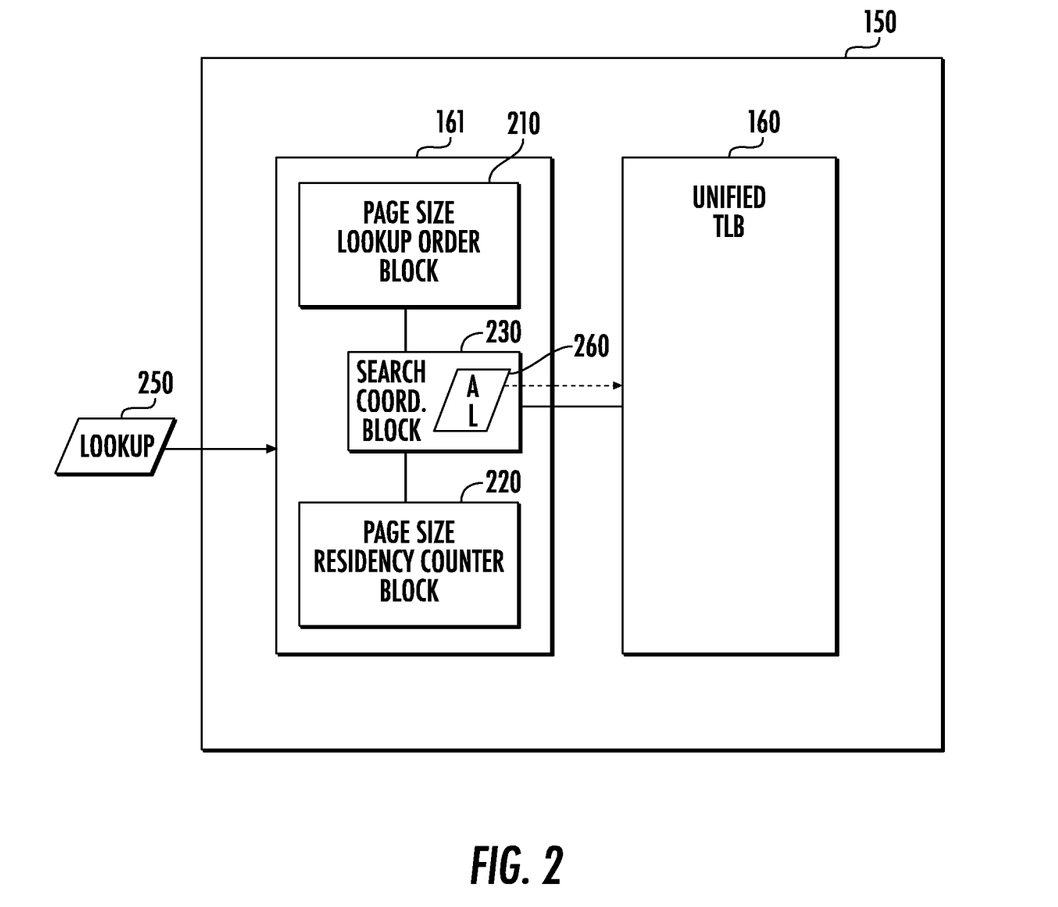
FIG. 2 is a detailed block diagram of an exemplary memory management unit (MMU) including a unified TLB supporting a plurality of page sizes.

Additionally, the above-described aspects may be combined with each other, or with other metadata related to lookups, in order to further enhance the performance of the unified TLB 160. In this regard, FIG. 2 is a detailed block diagram 200 of the memory management unit (MMU) 150 including the unified TLB 160 supporting a plurality of page sizes and the page size residency metadata block 161. The page size residency metadata block 161 further includes a page size lookup order block 210 and a page size residency counter block 220, each coupled to a search coordination block 230, which is coupled to the unified TLB 160.

The page size lookup order block 210 is configured to maintain a list of the plurality of page sizes that may be stored in the unified TLB 160. The page size lookup order block 210 is further configured to track metadata associated with each page size during transactions (e.g., fills, evictions, and invalidates or the like) involving the unified TLB 160, and determine an order in which lookups should be conducted on the plurality of page sizes in the unified TLB 160. The order in which lookups should be conducted may be based on any ordering algorithm. For example, the page size lookup order block 210 may track the most recently used page sizes in transactions involving the unified TLB 160, and may maintain the list of the plurality of page sizes in most-recently-used order. In other aspects, the order may be random, exact age order (oldest page sizes to youngest), first-in-first-out (FIFO), or most frequently used, as other examples.

The page size residency counter block 220 includes a plurality of counters, each of the counters associated with a page size of the plurality of page sizes capable of being stored in the unified TLB 160. Each counter is configured to exactly track the number of entries associated with that page size currently stored in the unified TLB 160, and is configured to indicate when no entries associated with that page size are currently stored in the unified TLB 160.

The page size residency counter block 220 and the page size lookup order block 210 are both coupled to the search coordination block 230, which in one aspect receives the counter information from the page size residency counter block 220 and the lookup order information from the page size lookup order block 210. The search coordination block 230 associates a lookup request 250 with the current counter information and the current lookup order information to form an annotated lookup request 260, which is provided to the unified TLB 160 to be performed. In an exemplary aspect, the unified TLB 160 may use the current lookup order information (which may be most recently used order in one example) to choose an order in which to search the plurality of page sizes (i.e., the unified TLB 160 will search more recently used page sizes before less recently used page sizes), and may use the current counter information to suppress the lookup to any page sizes of the plurality of page sizes that are not currently resident in the unified TLB 160. Additionally, if the unified TLB 160 determines from the counter information that either all of the page sizes, or all of the remaining page sizes of the plurality page sizes that have not yet been looked up, are not resident in the unified TLB 160, the unified TLB 160 may terminate the lookup early.

Figure 3A:
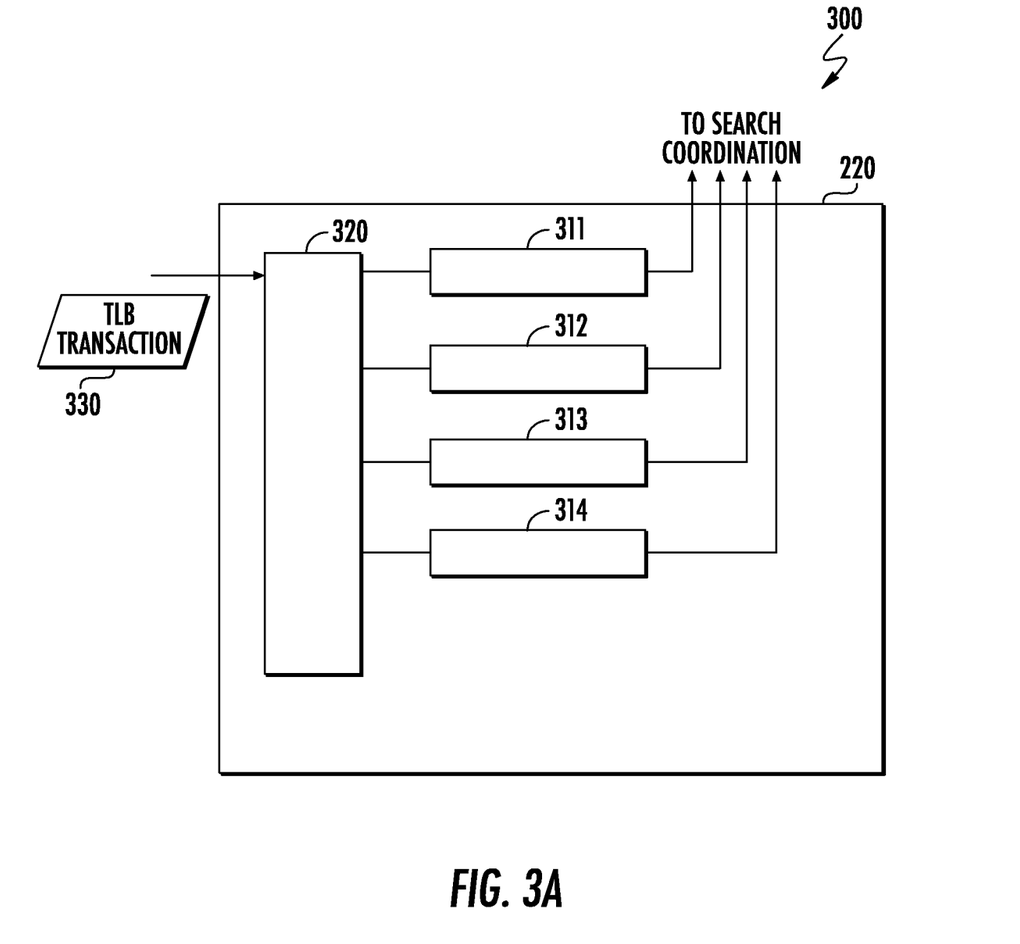
FIG. 3a is a detailed diagram of an exemplary page size residency counter block.

FIG. 3a is a detailed diagram 300 of an exemplary page size residency counter block according to one aspect, such as the page size residency counter block 220 of FIG. 2. The page size residency counter block 220 comprises a counter management block 320 coupled to a plurality of counters 311, 312, 313, and 314. Each one of the plurality of counters 311, 312, 313, and 314 is associated with one of the page sizes of the plurality of page sizes that may be stored in an associated unified TLB, such as the unified TLB 161 of FIGS. 1 and 2. The page size residency counter block 220 is configured to monitor TLB transactions such as TLB transaction 330 in the counter management block 320. Depending on the result of the TLB transaction 330 in the associated unified TLB, the counter management block 320 may change the value stored in the counter 311-314 corresponding to the page size associated with the TLB lookup 330 (i.e., the page size residency counter block 220 dynamically adjusts the counters to reflect changes in the contents of the TLB). For example, if the result of the TLB transaction 330 is a fill of the TLB with a translation corresponding to the page size associated with counter 311, then the counter management block 320 may cause the value stored in counter 311 to be incremented. Conversely, if the result of the TLB transaction 330 is an eviction of a translation corresponding to the page size associated with counter 311, then the counter management block 320 may cause the value stored in counter 311 to be decremented. Additionally, the counter management block 320 may monitor other types of TLB transactions, such as invalidations (whether of the full TLB, or portions thereof), and may adjust the counters accordingly (i.e., reset all counters on a full invalidation, or adjust individual counters associated with a partial invalidation).

Figure 3B:
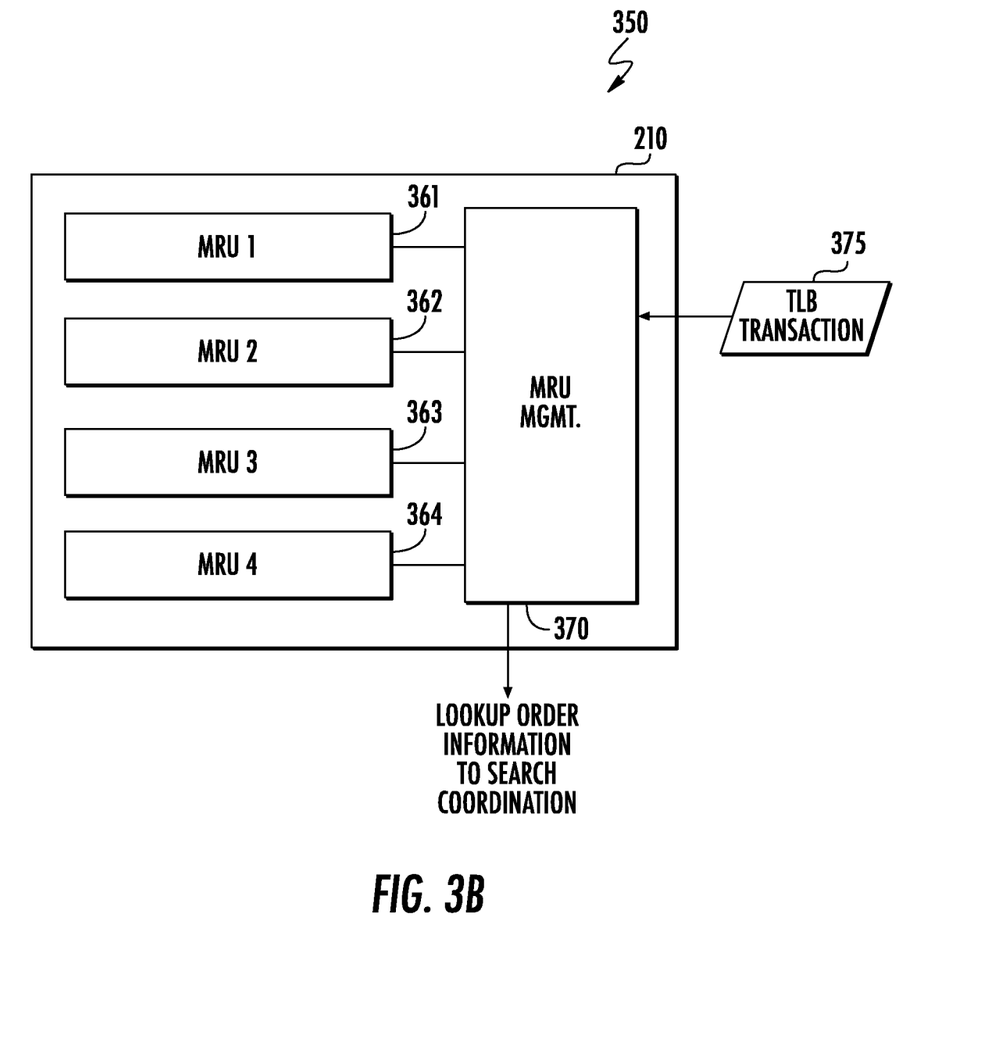
FIG. 3b is a detailed diagram of an exemplary page size lookup order block.

FIG. 3b is a detailed diagram 350 of an exemplary page size lookup order block according to one aspect, such as the page size lookup order block 210 of FIG. 2. The page size lookup order block 210 comprises a plurality of most-recently-used (MRU) entries 361, 362, 363, and 364, coupled to a most-recently-used (MRU) management block 370. Each of the MRU entries 361-364 is associated with one page size of the plurality of page sizes that may be resident in an associated unified TLB, such that the number of MRU entries is the same as the number of page sizes of the plurality of page sizes. The MRU management block 370 is configured to adjust the MRU entries 361-364 to maintain current information regarding a most-recently-used order of page sizes based on TLB transactions such as TLB transaction 375 (i.e., the order is dynamically updated based on the changing contents of the TLB). For example, upon a reset or TLB invalidation, all of the MRU entries 361-364 may be initialized as empty. Upon a TLB fill of a particular page size, the MRU management block 370 optionally populates one of the entries 361-364 with the particular page size, and then adjusts the relative order of all of the entries 361-364 to indicate that the entry associated with the most recent page size filled is the most recent entry in lookup order. Those having skill in the art will recognize that there are many different ways of implementing the MRU entries 361-364 and the MRU management block 370 in order to track a most recently used lookup order, and all of these are within the scope of the teachings of the present disclosure. Further, in some aspects, the page size lookup order block 210 may also be responsive to context information from the CPU 105 (for example, each exception level of the CPU 105 may have an associated MRU management block 270 and MRU entries 361-364, such that the page size lookup order block 210 may include a plurality of MRU management blocks and a plurality of sets of MRU entries).

Figure 3C:
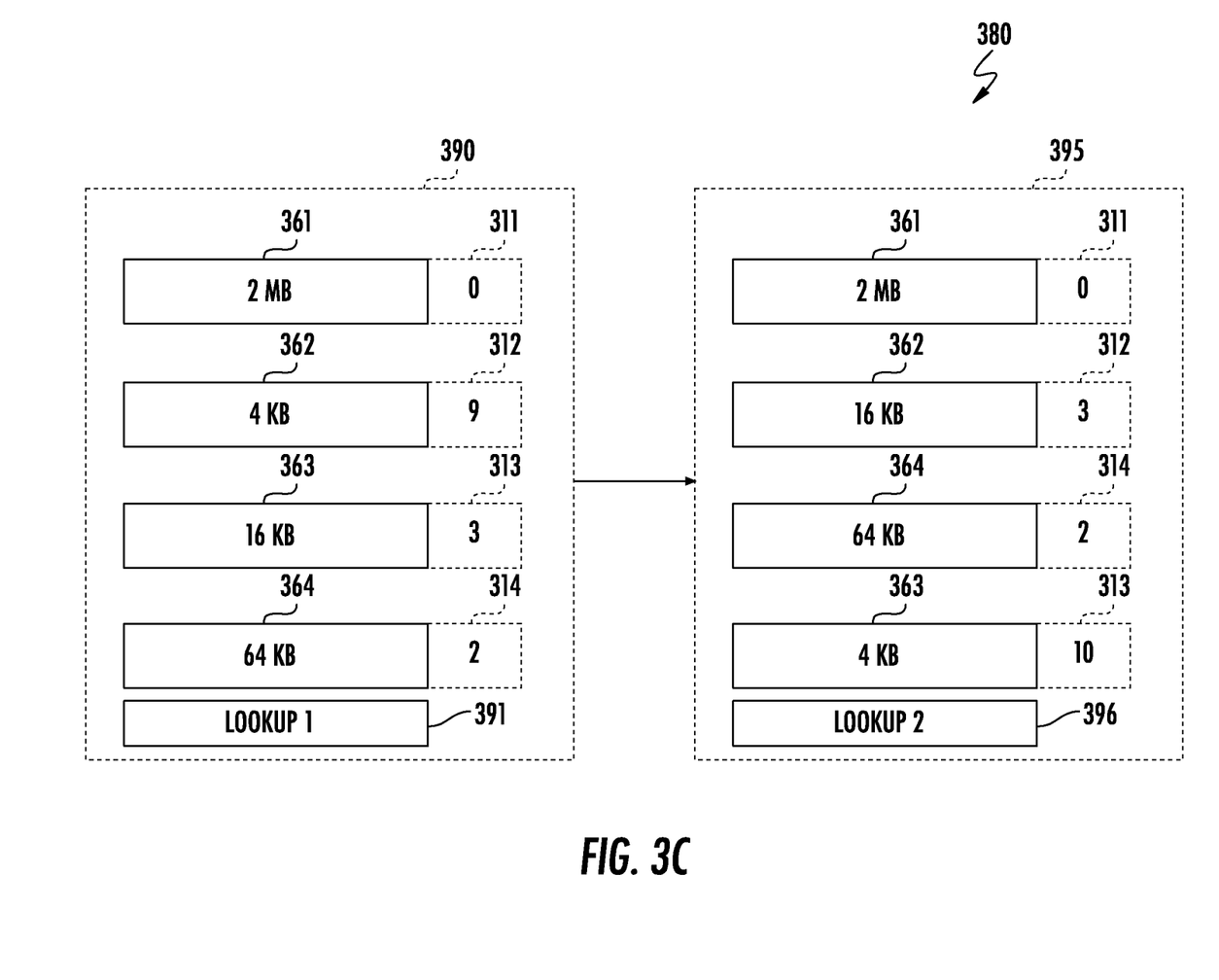
FIG. 3c is a block diagram illustrating two exemplary annotated lookup requests.

As discussed above in reference to FIG. 2, the counter information stored in the page residency counter lookup block 220 of FIG. 3a and the most recently used information stored in the page size lookup order block 210 of FIG. 3b may be used to form an annotated lookup request which may be provided to the unified TLB 160. In this regard, FIG. 3c is a block diagram 380 illustrating two exemplary annotated lookup requests. In one aspect, the unified TLB 160 supports page sizes of 4 kilobytes (kB), 16 kB, 64 kB, and 2 megabytes (MB). Thus, the page size residency counter lookup block 220 has four counters (one for each page size), and the page size lookup order block 210 has four entries (again, one for each page size). Each time a lookup request is received by the MMU 150, the search coordination block 230 annotates the lookup request with current information from the page size lookup order block 210 and the page size residency counter block 220.

For example, a first lookup request 391 is annotated to form a first annotated lookup request 390. The first annotated lookup request 390 includes information from MRU entries 361-364 showing that the current most-recently-used order of the page sizes is 2 MB, 4 kB, 16 kB, and 64 kB (from least recent to most recent). Additionally, the first annotated lookup request 390 further includes information from counters 311-314 indicating how many entries of each page size are resident in the unified TLB 160. For example, at the time of the first lookup request 391, there are 0 2 MB pages, 9 4 kB pages, 3 16 kB pages, and 2 64 kB pages resident in the unified TLB 160. The first annotated lookup request 390 may be provided to the unified TLB 160, which may perform a lookup accordingly by first looking up 64 kB pages, then 16 kB pages, then 4 kB pages, and may suppress the lookup for 2 MB pages (since there are none resident in the unified TLB 160), and may terminate the lookup early if a page translation associated with the first lookup request 391 has not been found in one of the previous page sizes.

Further, at some time later, a second lookup request 396 is annotated to form a second annotated lookup request 395. The second annotated lookup request 395 includes information from MRU entries 361-364 showing that the current most-recently-used order of the page sizes is 2 MB, 16 kB, 64 kB, and 4 kB (from least recent to most recent), indicating that in the time since the first lookup request 391, the TLB has had one fill at the 4 kB page size. Additionally, the second annotated lookup request 390 further includes information from counters 311-314 indicating how many entries of each page size are resident in the unified TLB 160. For example, at the time of the second lookup request 396, there are 0 2 MB pages, 3 16 kB pages, 2 64 kB pages, and 10 4 kB pages (thus, one more 4 kB page has been filled in the time since the first lookup request 391). The second annotated lookup request 395 may be provided to the unified TLB 160, which may perform a lookup accordingly by first looking up 4 kB pages, then 64 kB pages, then 16 kB pages, may suppress the lookup for 2 MB pages (since, again, there are none resident in the unified TLB 160), and may terminate the lookup early if a page translation associated with the second lookup request 396 has not been found in one of the previous page sizes.

Figure 4:
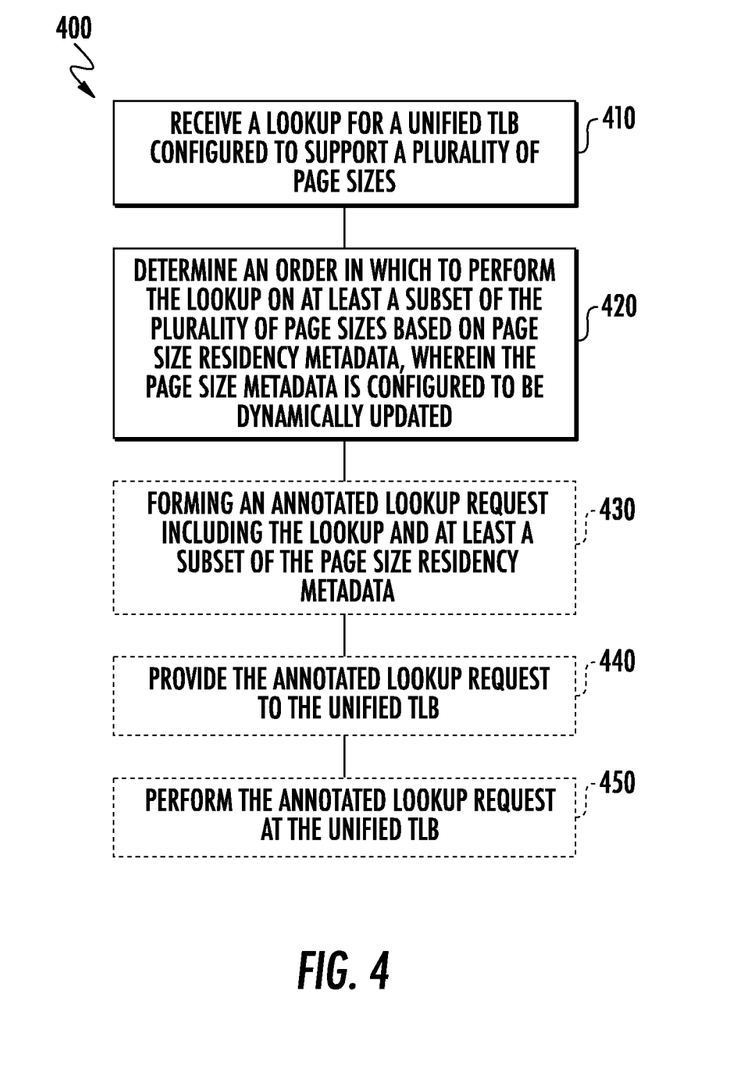
FIG. 4 is a flowchart illustrating a method of performing lookups in a unified TLB supporting a plurality of page sizes.

FIG. 4 is a flowchart illustrating a method 400 of performing lookups in a unified TLB supporting a plurality of page sizes. The method 400 may be performed by the MMU 150 as described above with reference to FIGS. 1-3c. The method begins in block 410, where a lookup request for a unified TLB configured to support a plurality of page sizes is received. For example, the lookup request 250 for the unified TLB 160 is received at the memory management unit 150.

The method continues in block 420, where an order in which to perform the lookup on at least a subset of the plurality of page sizes is determined. The order is based on page size residency metadata, which is configured to be dynamically updated. For example, the search coordination block 230 receives current counter information from the page size residency counter block 220 and receives current most recently used order information from the page size lookup order block 210.

The method then optionally continues to block 430, where an annotated lookup request is formed that includes the lookup and at least a subset of the page size residency metadata. For examples, as discussed with reference to FIG. 2, the search coordination block 230 uses the lookup request 250, the current counter information, and the current most recently used order information to form an annotated lookup request 260.

The method then optionally continues to block 440, where the annotated lookup request is provided to the unified TLB. For example, as discussed with reference to FIG. 2, the search coordination block 230 provides the annotated lookup request 260 to the unified TLB 160.

The method then optionally continues to block 450, where the unified TLB performs the annotated lookup request. For example, as discussed with reference to FIG. 3c, the unified TLB 160 may perform the second annotated lookup request 395 by first looking up 4 kB pages, then 64 kB pages, then 16 kB pages, may suppress the lookup for 2 MB pages (since, again, there are none resident in the unified TLB 160), and may terminate the lookup early if a page translation associated with the second lookup request 396 has not been found in one of the previous page sizes.

Those having skill in the art will recognize that the preceding figures and illustrated aspects are exemplary, and other aspects having different ordering algorithms (i.e., perform lookups on the plurality of page sizes in different lookup orders), numbers of page sizes, and other metadata associated with TLB lookups are possible. Although the annotated lookup requests illustrated in FIG. 3c track which page sizes are resident in the unified TLB 160 precisely, other implementations are possible. For example, as long as the annotated lookup request is guaranteed to be over-inclusive with respect to which page sizes are searched (i.e., it may cause a page size which is not resident in the TLB to be looked up, but may not cause a page size which is resident in the TLB to have its lookup suppressed), instead of providing storage sufficient to update and service an annotated lookup request in every cycle, the annotated information may only be updated every N cycles, which may trade off some level of lookup performance for reduced silicon area associated with the page size residency metadata.

An exemplary memory management unit configured to perform a lookup in a unified TLB, on at least a subset of a plurality of page sizes that the unified TLB is configured to support, and in an order based on page size residency metadata, may be provided in or integrated into any processor-based device. Examples, without limitation, include a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 5:
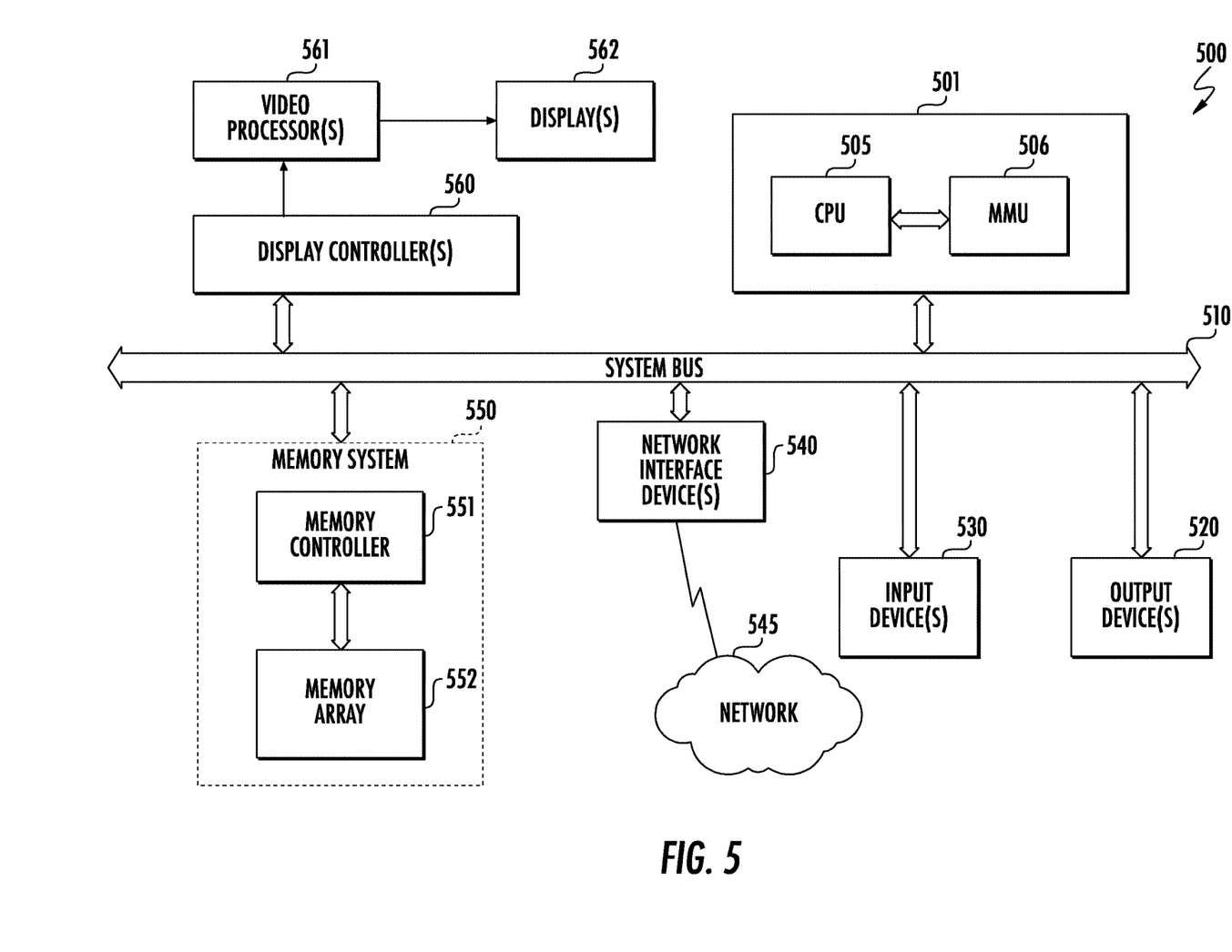
FIG. 5 is a block diagram of an exemplary processor-based system including a unified translation lookaside buffer (TLB) supporting a plurality of page sizes.

In this regard, FIG. 5 illustrates an example of a processor-based system 500 that can include an exemplary memory management unit configured to perform a lookup in a unified TLB, on at least a subset of a plurality of page sizes that the unified TLB is configured to support, and in an order based on page size residency metadata as described in FIGS. 1-3c, and may be configured to perform the method of FIG. 4. In this example, the processor-based system 500 includes a processor 501 having one or more central processing units (CPUs) 505, each including one or more processor cores, and which may correspond to the processor 105 of FIG. 1. The processor 501 may further include a memory management unit 506 (which may correspond to the MMU 150 of FIG. 1, and may include the page size residency metadata block 161 and the unified TLB 16). The CPU(s) 505 may be a master device. The CPU(s) 505 may have cache memory 508 coupled to the CPU(s) 505 for rapid access to temporarily stored data. The CPU(s) 505 is coupled to a system bus 510, which may correspond to the system bus 130 of FIG. 1, and can intercouple master and slave devices included in the processor-based system 500. As is well known, the CPU(s) 505 communicates with these other devices by exchanging address, control, and data information over the system bus 510. For example, the CPU(s) 505 can communicate bus transaction requests to a memory controller 551 as an example of a slave device. Although not illustrated in FIG. 5, multiple system buses 510 could be provided, wherein each system bus 510 constitutes a different fabric.

Other master and slave devices can be connected to the system bus 510. As illustrated in FIG. 5, these devices can include a memory system 550 (which may correspond to the memory hierarchy 140 of FIG. 1), one or more input devices 530, one or more output devices 520, one or more network interface devices 540, and one or more display controllers 560, as examples. The input device(s) 530 can include any type of input device, including, but not limited to, input keys, switches, voice processors, etc. The output device(s) 520 can include any type of output device, including, but not limited to, audio, video, other visual indicators, etc. The network interface device(s) 540 can be any devices configured to allow exchange of data to and from a network 545. The network 545 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 540 can be configured to support any type of communications protocol desired. The memory system 550 can include the memory controller 551 coupled to one or more memory arrays 552.

The CPU(s) 505 may also be configured to access the display controller(s) 560 over the system bus 510 to control information sent to one or more displays 562. The display controller(s) 560 sends information to the display(s) 562 to be displayed via one or more video processors 561, which process the information to be displayed into a format suitable for the display(s) 562. The display(s) 562 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. An apparatus, comprising:
a memory management unit (MMU) including a unified translation lookaside buffer (TLB) configured to support a plurality of page sizes and having a plurality of counters, each counter associated with a page size and configured to store page size residency metadata, the MMU further configured to:
perform a TLB transaction in the TLB; and
store and dynamically update in response to the TLB transaction, page size residency metadata of the counter associated with a page size of the TLB transaction, with a number of pages associated with the page size of the TLB transaction stored in the TLB associated with the counter,
the TLB further configured to perform a lookup for at least a subset of page sizes of the plurality of page sizes in an order based on the number of pages in the plurality of counters of the page size residency metadata.

2. The apparatus of claim 1, wherein the TLB is further configured to suppress a lookup for a first page size when a counter among the plurality of counters associated with the first page size indicates that no pages of the first page size are present in the TLB.

3. The apparatus of claim 1, wherein the TLB is further configured to perform a lookup for a second page size when a counter among the plurality of counters associated with the second page size indicates that at least one page of the second page size is present in the TLB.

4. The apparatus of claim 3, wherein the TLB is further configured to perform a lookup for a third page size before the second page size when a counter among the plurality of counters associated with the third page size indicates that more pages of the third page size are present in the TLB than pages of the second page size.

5. The apparatus of claim 1, further comprising a page size lookup order block configured to dynamically determine a lookup order for the plurality of page sizes.

6. The apparatus of claim 5, wherein the lookup order is based on at least one of a most recently used, most frequently used, exact age, first-in-first-out, or random order.

7. The apparatus of claim 5, wherein the lookup order is based on a combination of a most recently used and a most frequently used order.

8. The apparatus of claim 5, wherein when performing a lookup in the lookup order determined by the page size lookup order block, the TLB is further configured to suppress the lookup for a first page size of the plurality of page sizes when a counter among the plurality of counters associated with the first page size indicates that no pages of the first page size are present in the TLB.

9. The apparatus of claim 1, integrated into an integrated circuit (IC).

10. The apparatus of claim 9, further integrated into a device selected from the group consisting of: a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

11. The apparatus of claim 9, further integrated into a device selected from the group consisting of: a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

12. The apparatus of claim 1, integrated into an integrated circuit (IC).

13. An apparatus, comprising:
means for managing memory, the means for managing memory including means for caching translations configured to support a plurality of page sizes,
the means for managing memory further configured to store and dynamically update in response to the means for caching translations, a counter among a plurality of counters in page size residency metadata, with a number of pages associated with a page size among the plurality of page sizes associated with the counter,
the means for caching translations further configured to perform a lookup for at least a subset of page sizes of the plurality of page sizes in an order based on the number of pages in the plurality of counters of the page size residency metadata.

14. A method, comprising:
performing a translation lookaside buffer (TLB) transaction in a unified TLB configured to support a plurality of page sizes;
dynamically updating a counter among a plurality of counters in page size residency metadata, with a number of pages associated with a page size among the plurality of page sizes associated with the counter, in response to the TLB transaction;
receiving a lookup for the unified TLB; and
determining an order in which to perform the lookup on at least a subset of the plurality of page sizes based on the number of pages in the plurality of counters of the page size residency metadata.

15. The method of claim 14, further comprising forming an annotated lookup request including the lookup and at least a subset of the page size residency metadata.

16. The method of claim 15, further comprising:
providing the annotated lookup request to the unified TLB; and
performing the annotated lookup request at the unified TLB.

17. The method of claim 14, wherein the page size residency metadata includes an order of TLB transactions, and wherein the order is based on at least one of a most recently used, most frequently used, exact age, first-in-first-out, or random order.

18. The method of claim 17, wherein the order is based on a combination of a most recently used and a most frequently used order.

19. The method of claim 14, further comprising:
suppressing a lookup for a first page size when a counter among the plurality of counters associated with the first page size indicates that no pages of the first page size are present in the TLB; and
performing a lookup for a second page size when a counter among the plurality of counters associated with the second page size indicates that at least one page of the second page size is present in the TLB.

20. The method of claim 19, wherein the page size residency metadata further includes an order of TLB transactions, and wherein the order is based on at least one of a most recently used, most frequently used, exact age, first-in-first-out, or random order.

21. The method of claim 20, wherein the order is based on a combination of a most recently used and a most frequently used order.

22. A non-transitory computer-readable medium having stored thereon computer executable instructions which, when executed by a processor, cause the processor to:
perform a translation lookaside buffer (TLB) transaction in a unified TLB configured to support a plurality of page sizes;
dynamically update a counter among a plurality of counters in page size residency metadata, with a number of pages associated with a page size among the plurality of page sizes associated with the counter, in response to the TLB transaction;
receive a lookup for the unified TLB; and
determine an order in which to perform the lookup on at least a subset of the plurality of page sizes based on the number of pages in the plurality of counters of the page size residency metadata.

23. The non-transitory computer-readable medium of claim 22, further comprising computer executable instructions which, when executed by the processor, cause the processor to form an annotated lookup request including the lookup and at least a subset of the page size residency metadata.

24. The non-transitory computer-readable medium of claim 23, further comprising computer executable instructions which, when executed by the processor, cause the processor to:
provide the annotated lookup request to the unified TLB; and
perform the annotated lookup request at the unified TLB.

25. An apparatus, comprising:
a memory management unit (MMU) including a unified translation lookaside buffer (TLB) configured to support a plurality of page sizes, the MMU further configured to:
perform a TLB transaction in the TLB; and
store and dynamically update in response to the TLB transaction, an order of TLB transactions based on page size residency metadata associated with each of the plurality of page sizes and comprising at least one of a most recently used page size among the plurality of page sizes, most frequently used page size among the plurality of page sizes, exact age of the plurality of page sizes, first-in-first-out of page sizes among the plurality of page sizes, or random order of the plurality of page sizes,
the TLB further configured to perform a lookup for at least a subset of page sizes of the plurality of page sizes in an order based on the page size residency metadata.

26. The apparatus of claim 25, wherein the page size residency metadata comprises a plurality of counters, each counter associated with a page size and configured to track a number of pages of an associated page size present in the TLB.

27. The apparatus of claim 26, wherein the TLB is further configured to suppress a lookup for a first page size when a counter associated with the first page size indicates that no pages of the first page size are present in the TLB.

28. The apparatus of claim 26, wherein the TLB is further configured to perform a lookup for a second page size when a counter associated with the second page size indicates that at least one page of the second page size is present in the TLB.

29. The apparatus of claim 28, wherein the TLB is further configured to perform a lookup for a third page size before the second page size when a counter associated with the third page size indicates that more pages of the third page size are present in the TLB than pages of the second page size.

30. The apparatus of claim 26, further comprising a page size lookup order block configured to dynamically determine a lookup order for the plurality of page sizes.

31. The apparatus of claim 30, wherein lookup order is based on a combination of a most recently used and a most frequently used order.

32. The apparatus of claim 30, wherein when performing a lookup in the lookup order determined by the page size lookup order block, the TLB is further configured to suppress the lookup for a first page size of the plurality of page sizes when a counter associated with the first page size indicates that no pages of the first page size are present in the TLB.

33. A method, comprising:
performing a translation lookaside buffer (TLB) transaction in a unified TLB configured to support a plurality of page sizes;
dynamically updating an order of TLB transactions based on page size residency metadata associated with each of the plurality of page sizes and comprising at least one of a most recently used page size among the plurality of page sizes, most frequently used page size among the plurality of page sizes, exact age of the plurality of page sizes, first-in-first-out of page sizes among the plurality of page sizes, or random order of the plurality of page sizes, in response to the TLB transaction;
receiving a lookup for the unified TLB; and
determining an order in which to perform the lookup on at least a subset of the plurality of page sizes based on the page size residency metadata.

34. The method of claim 33, further comprising forming an annotated lookup request including the lookup and at least a subset of the page size residency metadata.

35. The method of claim 34, further comprising:
providing the annotated lookup request to the unified TLB; and
performing the annotated lookup request at the unified TLB.

36. The method of claim 33, wherein the order is based on a combination of a most recently used and a most frequently used order.

37. The method of claim 33, further comprising:
suppressing a lookup for a first page size when a counter associated with the first page size indicates that no pages of the first page size are present in the TLB; and
performing a lookup for a second page size when a counter associated with the second page size indicates that at least one page of the second page size is present in the TLB.

38. A non-transitory computer-readable medium having stored thereon computer executable instructions which, when executed by a processor, cause the processor to:
perform a translation lookaside buffer (TLB) transaction in a unified TLB configured to support a plurality of page sizes;
dynamically update an order of TLB transactions based on page size residency metadata associated with each of the plurality of page sizes and comprising at least one of a most recently used page size among the plurality of page sizes, most frequently used page size among the plurality of page sizes, exact age of the plurality of page sizes, first-in-first-out of page sizes among the plurality of page sizes, or random order of the plurality of page sizes, in response to the TLB transaction;
receive a lookup for the unified TLB; and
determine an order in which to perform the lookup on at least a subset of the plurality of page sizes based on the page size residency metadata.

* * * * *